April 24, 1962 D. B. APPLETON ETAL 3,031,565
CONDITION-RESPONSIVE CONTROL DEVICE
Filed June 8, 1959 5 Sheets-Sheet 1

Inventors;
David B. Appleton,
Bruce D. Butts,
by Harold Levine Att'y.

April 24, 1962   D. B. APPLETON ETAL   3,031,565
CONDITION-RESPONSIVE CONTROL DEVICE
Filed June 8, 1959   5 Sheets-Sheet 3

Inventors;
David B. Appleton,
Bruce D. Butts,
by Harold Levine Att'y.

April 24, 1962 D. B. APPLETON ETAL 3,031,565
CONDITION-RESPONSIVE CONTROL DEVICE
Filed June 8, 1959 5 Sheets-Sheet 4

Inventors;
David B. Appleton,
Bruce D. Butts,
by Harold Levine Att'y.

April 24, 1962 D. B. APPLETON ET AL 3,031,565
CONDITION-RESPONSIVE CONTROL DEVICE
Filed June 8, 1959 5 Sheets-Sheet 5

Inventors;
David B. Appleton,
Bruce D. Butts,
by Harold Levine Att'y.

United States Patent Office 3,031,565
Patented Apr. 24, 1962

3,031,565
CONDITION-RESPONSIVE CONTROL DEVICE
David B. Appleton, Attleboro, and Bruce D. Butts, North Easton, Mass., assignors to Texas Instruments Incorporated, Dallas, Tex., a corporation of Delaware
Filed June 8, 1959, Ser. No. 818,863
15 Claims. (Cl. 219—44)

The present invention relates to electrically heated cooking receptacles and detachable condition-responsive control means therefor to control a cooking operation therein. Although not limited thereto, the detachable condition-responsive control device of the instant invention is especially suited to control an automatic electric coffee maker in which coffee completes a brewing or percolation cycle and is thereafter maintained at a "keep-hot" drinking temperature without permitting re-percolation. It is to be understood, however, that the invention, as to certain aspects, is not limited to automatic electric coffee makers, but may be used wherever found applicable.

The control device of the instant invention is especially adapted to control electric coffee makers which are generally in the following two categories, those which have a single heating element for both percolating and "keep-hot"; and those which are provided with two heating elements, one for producing the high heat required during the percolation coffee-making operation and the other to maintain the coffee at a lower "keep-hot" drinking temperature. In providing controls, detachable and otherwise, for electric coffee makers of the type having a single heater (which provides heat to both percolate the coffee and maintain it at a "keep-hot" drinking temperature after percolation has occurred), one of the problems encountered is that, after percolation of the coffee has been completed, the control device, in maintaining the coffee at the lower "keep-hot" drinking temperature, must keep the heater on only for very short periods, for example, periods not exceeding five seconds, or else the coffee will re-percolate. Re-percolation will cause the coffee to become too strong and will generally result in an undesirable beverage. Presently known devices, especially those employing thermostats which depend solely on ambient temperature sensing for their operation, have generally proved inadequate in that heat is not transferred to the thermostat rapidly enough to de-energize the heater within the above-mentioned short period.

It is accordingly one object of the instant invention to provide a control device which will obviate the above-mentioned problems.

It is another object to provide a detachable control plug for an appliance which will permit the appliance to be constructed so as to be completely immersible in water or other cleaning fluids.

A further object of the instant invention is to provide a detachable heat and current sensitive control for an automatic electric coffee brewer in which a single temperature and current sensitive member is so arranged as to terminate a first brewing heating cycle at a predetermined temperature of the brewed coffee and to subsequently maintain the brewed coffee substantially at "keep-hot" temperature.

It is yet another object of the instant invention to provide a detachable control means which is both current and heat sensitive, which is simple in construction, inexpensive to manufacture, and reliable in operation for a heating unit control of a cooking receptacle.

It is yet another object of the instant invention to provide a detachable control means which is both current and heat sensitive and is effective to maintain coffee in a single heater type electric coffee maker at a "keep-hot" or serving temperature after percolation has occurred, without permitting the coffee to re-percolate.

It is yet another object of the instant invention to provide a detachable control means having current overload protection for an immersible appliance.

It is yet another object of the invention to provide a detachable control means which is both current and heat sensitive of the type which includes a probe section formed integrally with the casing of the detachable control device.

Other objects and advantages will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated.

Similar reference characters indicate corresponding parts throughout the several views of the drawings.

Dimensions of certain of the parts as shown in the drawings have been modified and/or exaggerated for the purposes of clarity of illustration.

Although the present invention is applicable to controlled heating devices in general, it is particularly well adapted to control cooking devices such as electric coffee makers. Solely for the purpose of disclosing the invention, it has been illustrated as applied to a coffee maker.

*Detachable Control Plug for Single Heater Type Electrical Coffee Maker*

Figures 1, 2, 3, 3A, 4, 5:
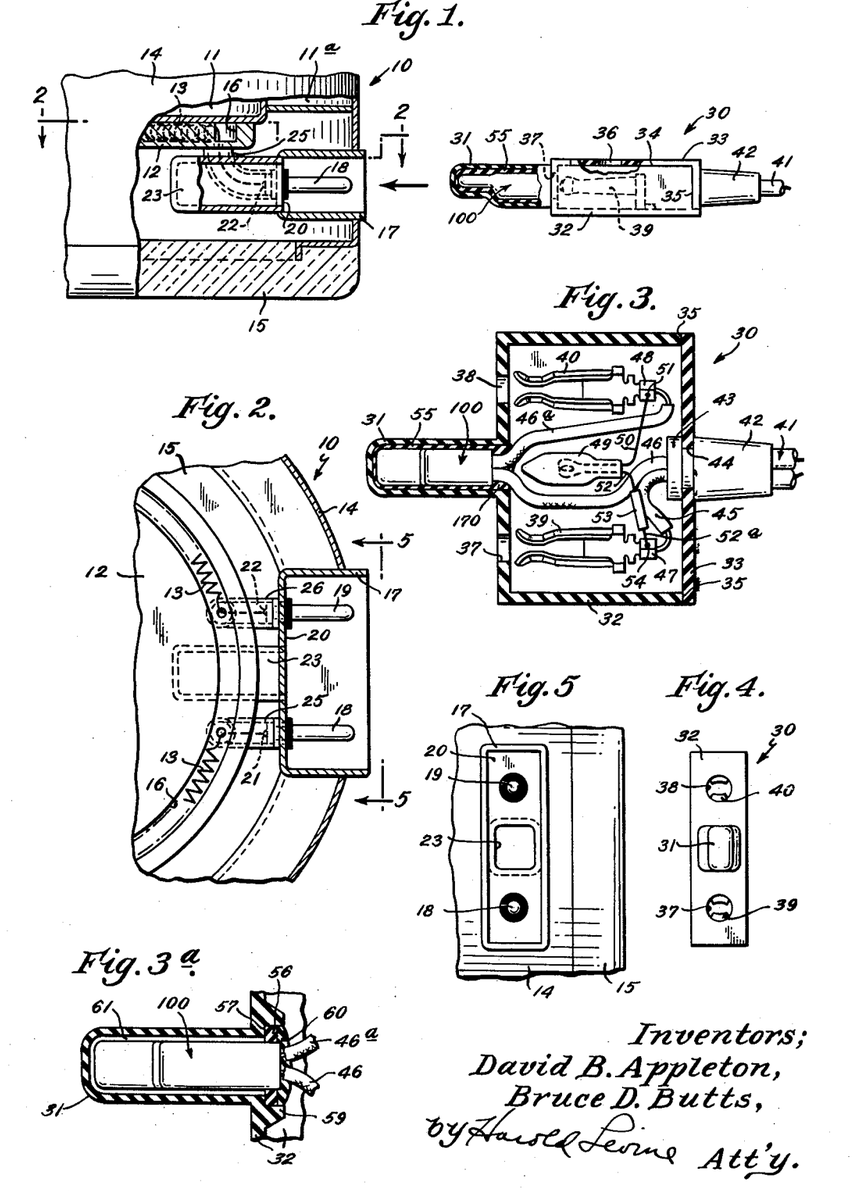
FIG. 1 is a side view, partly broken away, of a portion of an electrical cooking device and a detachable control plug therefor.
FIG. 2 is a sectional view through the cooking device shown in FIG. 1 along lines 2—2 thereof.
FIG. 3 is a top view of the detachable control plug shown in FIG. 1, with casing and probe section broken away.
FIG. 3a is an enlarged top view of a modification of the mounting of a heat and current responsive control assembly within the probe section of a detachable control plug such as shown in FIG. 3.
FIG. 4 is a left-hand elevation of the detachable control plug shown in FIG. 3.
FIG. 5 is a partial view taken on line 5—5 of the electrical cooking appliance shown in FIG. 2.
Figure 6:
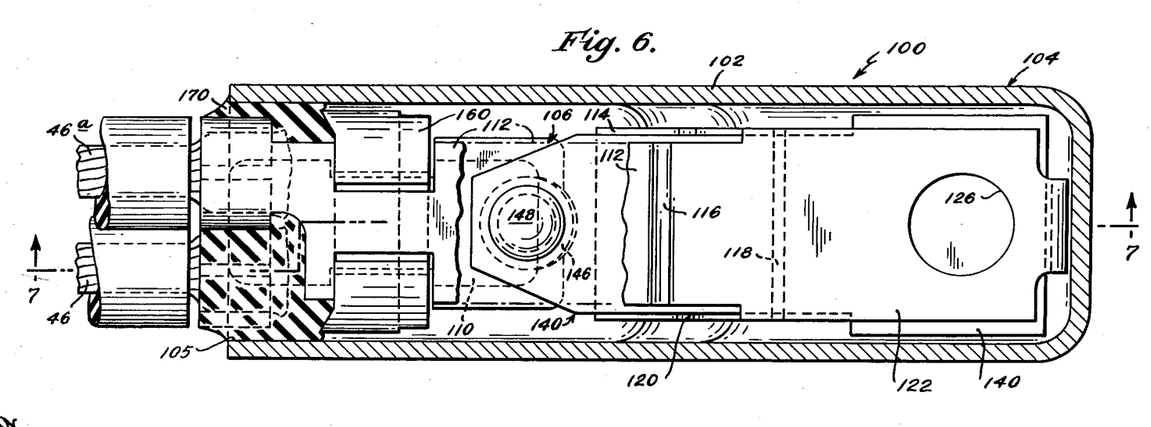
FIG. 6 is a top plan view, with parts broken away, of a temperature and current responsive thermostatic control assembly.

Referring now to the drawings, there is illustrated in FIG. 1 a portion of an exemplary electric percolator-type coffee maker generally designated by numeral 10, comprising a percolating well 11, a vessel 11a and a heating base 12 disposed adjacent said percolating well 11 and vessel 11a and having a single electrically insulated electrical heating element 13 disposed therein. The coffee maker 10 further includes side walls 14 and an electrically and heat insulated base 15. Heating base 12 is provided with an annular seating groove 16 in which electrically insulated heating coil or element 13 is disposed. Heating base 12 is formed of a heat conductive material and may, for example, comprise an aluminum casting. Mounted in side wall 14 is a detachable plug receiving socket 17 adapted for the reception of detachable control plug 30, as shown in FIG. 1. Electrically conducting male terminals 18 and 19 are suitably mounted on rear wall 20 of the plug receiving socket 17, as best seen in FIGS. 1 and 2. Terminals 18 and 19 are electrically connected to the coil 13 respectively as at 21 and 22, respectively through conduits 25 and 26 forming part of heating base 12, as best seen in FIG. 2. Also mounted on wall 20 of plug receiving socket 17 is a heat conducting well 23 which extends inwardly in thermally conductive juxtaposition with heater 13, percolating well 11 and vessel 11a. Heat conducting well 23 is formed complementary in shape to and is adapted to receive a probe section 31 of detachable control plug 30, in thermally conductive juxtaposition therewith. The coffee maker 10 can be constructed so as to be completely immersible in water or in other suitable cleaning fluids. This is made possible by the unique and novel detachable control plug which will be described in greater detail below.

As best seen in FIG. 1, the detachable control plug 30 generally comprises a housing including casing members 32 and 33 which are formed of a conventional electrically insulating heat-conductive material which may, for example, be a moldable, phenolic material. Casing member 33, as seen in FIG. 1, is in the nature of a cover member and extends along and mates with upper and side surfaces 34 and 35, respectively, of casing member 32. Upper casing member 33 is provided with an aperture or window 36, for a purpose to be described below. Formed or molded integrally with casing member 32 is a probe section 31 which is adapted to interfit within and be received in thermally conductive juxtaposition within heat conducting well 23 of coffee maker 10. Probe section 31 is formed of the same electrical insulating and heat conducting material as that of casing members 32 and 33. A heat and current sensitive thermostatic control assembly 100 (hereinafter referred to as thermostat 100) is mounted and disposed entirely within the probe section 31. An exemplary heat and current sensitive thermostatic assembly 100 will be described in greater detail below. Casing members 32 and 33 can be secured together in final assembled relation in any suitable, known and convenient manner such as by bolting, riveting or the like (not shown).

Turning now to FIG. 3, casing member 32 is provided with two apertures 37 and 38 which are adapted to receive bayonet terminals 18 and 19 of coffee maker 10. Detachable control plug 30 is further provided with spring clip terminals 39 and 40 disposed and suitably nested by conventional means (not shown) in casing member 32 adjacent apertures 37 and 38, respectively, and positioned to receive bayonet terminals 18 and 19, respectively, of coffee maker 10. A flexible, insulated, two-conductor power cord 41, which includes flexible conductors 45 and 46 is secured to and extends through a flexible rubber strain relief 42 into the interior of casing member 32. The strain relief 42 and the power cord 41 are received in a suitable open-ended U-shaped slot 44 provided in casing member 33. Detachable control plug 30 is also provided with an indicating lamp 49 and a conventional high-resistance current limiting element 53 connected therewith which, when in final assembled relation, is visible through window or aperture 36 formed in casing member 33 to indicate whether the thermostat contacts are made or broken.

Thermostat 100 is mounted entirely within probe housing 31 in electrically insulated and thermally conductive relation therewith. An electrically insulating layer of an adhesive compound 55 which may, for example, take the form of an epoxy potting compound surrounds and is interposed between thermostat 100 and the probe enclosure means 31. The potting compound serves to mount and maintain thermostat 100 in fixed assembled position within, and also to improve thermal conductivity between thermostat 100 and probe housing 31, as best seen in FIG. 3.

FIG. 3a illustrates another type of mounting for thermostat 100 within the probe section 31. In this modification, there is no layer of epoxy or potting compound interposed between the body of the thermostat and the interior surface of the probe enclosure housing 31, as is the case in FIG. 3. The thermostat 100 is instead mounted entirely within the probe housing but spaced from the interior walls thereof so as to provide an air space or layer 61 of air surrounding and separating the thermostat 100 from the interior surfaces of the probe housing. In this modification, thermostat 100 has mounted thereon a collar 56, which is formed of an electrically insulating material. Collar 56 is received in an annular seating groove or recess 57 provided by casing member 32 adjacent the entrance to the probe section. Casing member 32 provides annularly extending shoulders 58 and 59 which project or extend beyond collar 56 when in final assembled position and provide a confined enclosure for the reception of potting compound 60 which may be of a material substantially the same as that of potting compound 55. Collar 56, groove 57, shoulders 58 and 59 and potting compound 60 all co-operate to mount thermostat 100 in fixed assembled position within probe housing 31, as seen in FIG. 3a.

It has been found by providing an air layer between the thermostat 100 and the probe section, as illustrated in FIG. 3a, that the thermostat 100 is effective to terminate the percolation cycle at substantially the same temperature as that of the thermostat 100 mounted, as illustrated in FIG. 3, and is thereafter effective, without permitting re-percolation, to maintain the coffee at a "keep-hot" drinking temperature which is higher than that attainable by the same thermostat 100, with a given calibration, mounted in the probe section 31, as illustrated in FIG. 3. Replacing the potting compound 55 with air layer 61 results in maintaining a temperature difference between the control 30 and appliance 10 in the thermal equilibrium condition since a thermal barrier is provided therebetween and the wire leads 46 and 46a act to reduce the temperature of the thermostat 100 by carrying away heat. The thermal barrier is achieved with little loss of sensitivity because in replacing the potting compound 55 with a layer of air 61, the thermal mass of the probe section and thermostat 100 therein has correspondingly been reduced. The net result in control of the appliance 10 by replacing the potting compound with an air layer is to substantially raise the "keep-hot" temperature of the coffee without changing the coffee temperature at which thermostat 100 terminates the percolating cycle of coffee maker 10.

Casing members 32 and 33, with the integrally formed or molded probe section 31, provide a number of advantages enabling simplified and inexpensive production and assembly of the detachable control plug 30. Casing member 32, with its integrally formed or molded probe section 31, advantageously permits spring clip terminals 39 and 40, indicating light 49 and thermostat 100 along with power cord 41 to be individually mass produced and preassembled into a subassembly which is easily and quickly assembled into operative position within casing member 32 and probe section 31. When the spring clip terminals, indicating light, thermostat and power cord subassembly are in operative assembled position in casing 32 and probe section 31, all that remains to complete the detachable plug is to mount casing member 33. In addition to providing a simple and low-cost method of assembling the control in casing member 32, the probe section 31, which is integrally formed with casing 32 of electrically insulating material, provides electrical insulation between the control and appliance and protects the control from mechanical damage which might cause unwanted calibration shifts. The potting 55 also overcomes the problem of fit tolerances between the thermostat 100 and probe section 31.

FIGS. 6–10 illustrate, by way of example, one specific type of heat and current sensitive thermostat which might be employed with the detachable control plug 30 described above. The heat and current sensitive thermostat 100 illustrated in FIGS. 6–10 has been found to be especially suited and particularly well adapted for the detachable control plug 30 described above. It is to be understood, however, that there may be other heat and current sensitive thermostats which could also be employed within the integrally formed or molded probe section 31 of the casing member 32 in the practice of the instant invention. The exemplary heat and current sensitive thermostat illustrated in FIGS. 6–10 forms the subject matter of a copending application to Walter H. Moksu et al., Serial No. 812,528, filed May 11, 1959, which application is assigned to the assignee of the instant application. Reference may be had to this copending application for specific details of construction of the thermostat.

Figure 7:
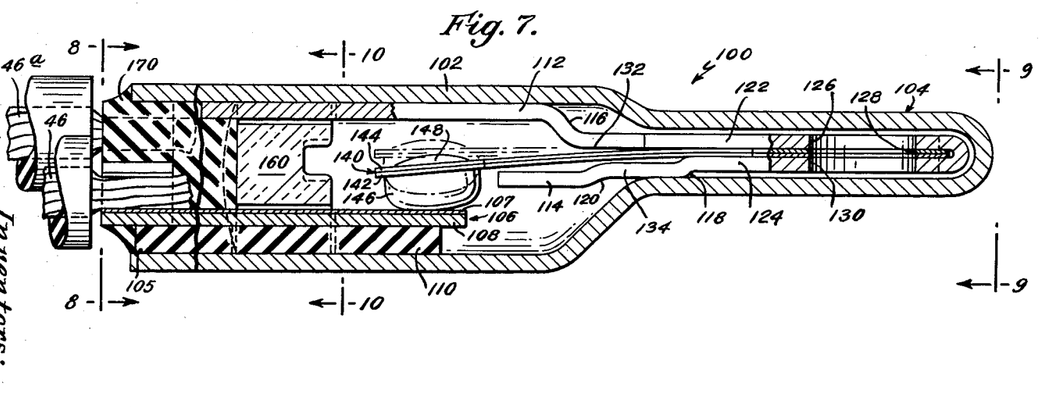
FIG. 7 is a sectional view of the thermostatic control assembly taken on line 7—7 of FIG. 6.
Figure 8:
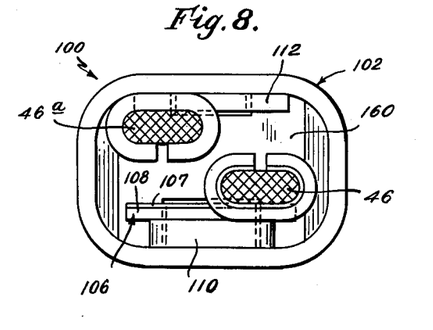
FIG. 8 is a sectional view of the thermostatic control assembly taken on line 8—8 of FIG. 7.
Figure 9:
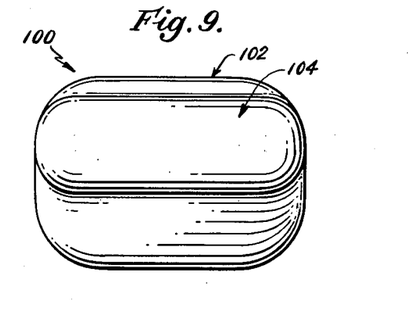
FIG. 9 is a view of the thermostatic assembly taken on line 9—9 of FIG. 7.
Figure 10:
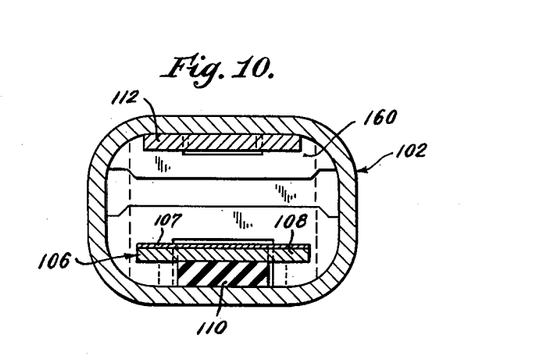
FIG. 10 is a sectional view of the thermostatic assembly taken on line 10—10 of FIG. 7.

In general, the exemplary heat and current sensitive thermostat 100 comprises an open-ended metallic electrically conducting housing or can 102. Housing 102, in general, has a rear closed-end portion 104 of reduced cross-sectional area and a forward open-ended portion 105 which is adapted to receive a completed thermostatic subassembly to be briefly described below. The thermostatic subassembly includes a stationary or fixed terminal 106 which may, for example, comprise a layer of silver or a silver alloy 107 bonded or otherwise adhered to a base layer 108. Stationary terminal 106 is maintained in spaced electrically insulated relation to can 102 by insulator 110, in which is interposed between terminal 106 and housing or can 102, as best seen in FIGS. 7, 8 and 10.

The thermostatic subassembly further includes an electrically conducting upper terminal 112. Upper terminal 112 extends rearwardly from the open end 105 of can 102 into the reduced portion 104 thereof and includes a return portion 114 which extends forwardly toward the open end 105 and terminates just rearwardly of the stationary terminal 106. Upper terminal 112 includes closely spaced and substantially parallel portions 122 and 124 which are disposed in reduced section 104 of can 102. As best seen in FIG. 7, closely spaced portions 122 and 124 sandwich and mount therebetween, in cantilever fashion and in electrically conducting relationship, one end of thermal element 140.

Thermal element 140 comprises a creep-type strip of thermostatic material which may take the form of conventional bimetal. The bimetal may comprise two layers 142 and 144 of metal having different coefficients of thermal expansion suitably secured to each other with the high expansion layer on the lower side as at 142. Thermal element 140 is provided with a contact 146 conveniently secured to the free end of thermal element 140 by rivet head 148. In practice, upper terminal 112 and thermal element 140 are mass produced and are preassembled as an individual subassembly unit.

Means 160 are provided for maintaining upper terminal 112 and lower terminal 106 along with lower insulator 110 in electrically insulated spaced assembled relation within can 102. Spacing means 160 takes the form of a ceramic header, as best seen in FIGS. 7 and 10. As more fully described in the above-mentioned copending application, ceramic header 160 is of electrically insulating material and includes notched portions which mate and interfit with complementary shaped notched portions provided respectively on upper terminal 112, lower terminal 106 and lower insulator 110 so as to maintain the aforementioned terminals and insulator in proper assembled electrically insulated spaced relation. Conductors 46a and 46 are respectively electrically connected, as by crimping, to upper terminal 112 and lower terminal 106. After the entire assembly, as described above, has been inserted into can 102, an electrically insulating sealing compound 170, which may, for example, take the form of an epoxy potting compound, is applied about the open end 105 of can 102 to mount, hermetically seal and maintain the assembly in can 102 in its proper assembled condition. The thermal element 140 of thermostat assembly 100 can be easily calibrated by exteriorly deforming the reduced portion 104 of can 102, which feature is more fully described in the above-mentioned copending application.

Figure 11:
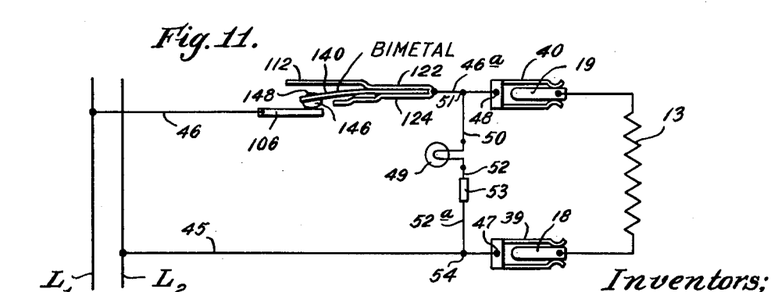
FIG. 11 is a schematic circuit diagram of the detachable control plug used with a single heater type cooking utensil.

FIG. 11 illustrates a schematic circuit diagram in which the thermostatic element 140 is mounted on upper terminal 112 which is electrically connected by conductor 46a to spring clip terminal 40 as at 48. Contact 146 is shown in electrical engagement with contact-carrying lower terminal 106, the latter of which is electrically connected to conductor 46 which is adapted for connection to one side $L_1$ of a power source. Conductor 45 is electrically connected to spring clip terminal 39 as at 47 and is adapted for connection to side $L_2$ of a source of power. Spring clip terminals 39 and 40 are illustrated as being releasably electrically connected respectively, with bayonet terminals 18 and 19 of coffee maker 10. Male or bayonet terminals 18 and 19 are respectively electrically connected with opposite sides of heater 13 of coffee maker 10. Indicating lamp 49 is electrically connected to spring clip terminal 40 as at 51 by means of conductor 50 and to spring clip terminal 39 as at 54 through conductor 52, resistance element 53 and conductor 52a. Indicating lamp 49 may instead be connected to conductors 46 and 46a, across the thermostat contacts, if desired.

Thermal element 140 which is both heat and current responsive, permits the thermostat 100 to "anticipate" the surge of heat and break contacts 146 and 106 within the above-mentioned extremely short period of time, so as to prevent re-percolation of the coffee while maintaining the coffee at a "keep-hot" or drinking temperature and also provides current overload protection, which is particularly desirable on an immersible appliance where the presence of moisture might cause temporary short circuiting.

Detachable Control Plug for Plural Heater Type Electric Coffee Maker

Electric coffee makers of the plural heater type generally include a large percolating heater and a smaller "keep-hot" heater connected in parallel electrical circuit relationship. A detachable control plug for such a plural heater type electric coffee maker must be effective to de-energize the large percolating heater after percolation has occurred and allow the smaller heater to maintain the coffee at a "keep-hot" drinking temperature without permitting the large heater to become re-energized to cause re-percolation during the "keep-hot" operation.

Figure 12:
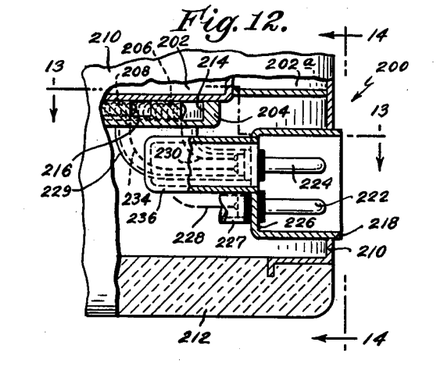
FIG. 12 is a side view, similar to FIG. 1, with parts broken away, of a portion of an electrical cooking device employing two heating units.
Figure 13:
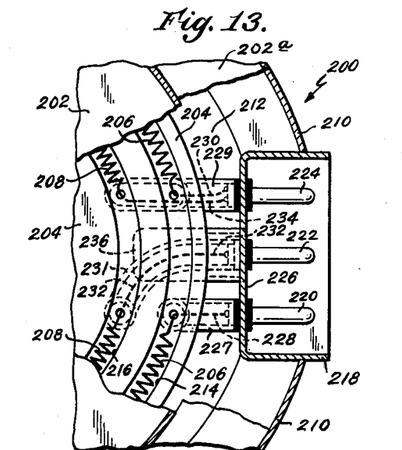
FIG. 13 is a sectional view of the electrical cooking device taken on line 13—13 of FIG. 12.
Figure 14:
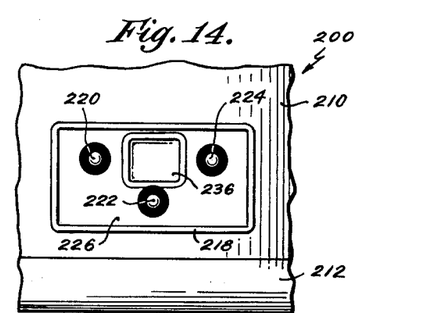
FIG. 14 is a side view of the cooking device taken on line 14—14 of FIG. 12.

Referring now to the drawing, there is illustrated in FIG. 12 an automatic coffee maker of the plural heater type generally designated by numeral 200, comprising a percolating well 202, vessel 202a and a heating base 204 adjacent said well 202 and vessel 202a and having disposed therein an electrically insulated percolating electrical heating element 206 and a smaller electrically insulated "keep-hot" electrical heating element 208. The coffee maker 200 has side walls 210 and an electrically and heat insulated base 212. Heating base 204 is provided with concentric annular seating grooves 214 and 216 in which electrically insulated heating elements 206 and 208 are respectively disposed. Heating base 204 is formed of a heat conductive material and may, for example, comprise an aluminum casting. Mounted in wall 210 is a detachable plug-receiving socket 218 adapted for the reception of detachable plug 250 illustrated (on a larger scale) in FIGS. 15 and 16. Electrically conducting male or bayonet type terminals 220, 222 and 224 are suitably mounted on rear wall 226 of the plug receiving socket 218, as best seen in FIGS. 12–14. Electrical heating element 206 is electrically connected at one end to male terminal 220 as at 228 through conduit 227 and at its other end to male terminal 224 as at 230 through conduit 229. Electrical heating element 208 is electrically connected at one end to male terminal 222 as at 232 through conduit 231 and at its other end to male terminal 224 as at 234 through conduit 229, as best seen in FIG. 13. Conduits 227, 229 and 231 are integral with and form a part of heating base 204. Also mounted on wall 226 of plug receiving socket 218 is a heat conducting well 236 which extends inwardly in thermally conductive juxtaposition with heaters 206, 208 in heating base 204, percolating well 202 and vessel 202a. Heat conducting well 236, which is similar to well 23 of coffee maker 10, is formed complementary in shape to and is adapted to receive probe section 256 of detachable control plug 250 in thermally conductive juxtaposition therewith. The coffee maker 200, like the coffee maker 10, can be constructed so as to be completely immersible in water or in other suitable cleaning fluids, which is made possible by the unique and novel detachable control plug 250 which will be described in greater detail below.

Figure 15:
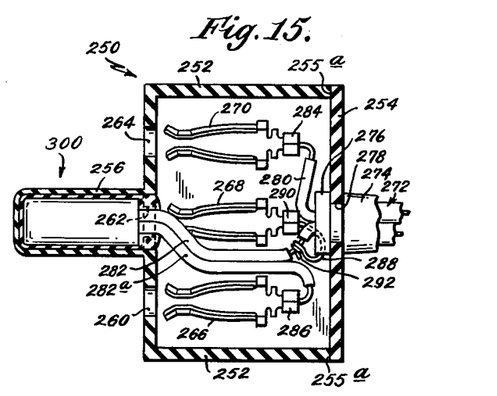
FIG. 15 is a top view of another embodiment of a detachable control device with the casing members and probe housing in section.
Figure 16:
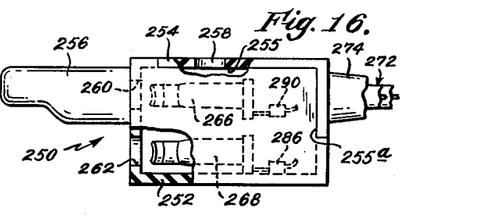
FIG. 16 is a side elevation of the detachable control plug shown in FIG. 15, with parts broken away.
Figure 17:
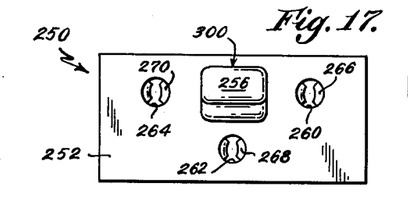
FIG. 17 is a left-hand side elevation of the detachable control plug shown in FIG. 16.

Detachable control plug 250 is generally similar to detachable control plug 30 described above. As best seen in FIG. 15, the detachable control plug 250 comprises a housing including casing members 252 and 254 which are formed of a conventional electrically insulating and heat-conducting material which may, for example, comprise a moldable phenolic material. Casing member 254, as best seen in FIG. 16, is in the nature of a cover member and extends along and mates with upper and end portions 255 and 255a, respectively, of casing member 252 as best seen in FIG. 16. Upper casing member 254 may be provided with an aperture or window 258 similar to window 36 of detachable control plug 30, described above. Formed or molded integrally with casing member 252 is a probe section 256 which is adapted to interfit within and be received, in thermally conductive juxtaposition, within heat conducting well 236 of coffee maker 200. Probe section 256 is formed of the same electrical insulating and heat-conducting material as that of casing members 252 and 254. A heat and current sensitive snap-acting thermostatic control assembly 300 (hereinafter referred to as thermostat 300) is mounted in thermally conductive juxtaposition with, and disposed entirely within probe section 256. An exemplary heat and current sensitive thermostatic assembly 300 will be described in greater detail below. Casing members 252 and 254 can be secured together in final assembled relation in any suitably known and convenient manner such as, for example, by bolting, riveting or the like (not shown).

Turning now to FIG. 15, casing member 252 is provided with three apertures 260, 262 and 264, each of which are adapted to respectively receive male terminals 220, 222 and 224 of coffee maker 200. Detachable control plug 250 is further provided with three spring clip terminals 266, 268 and 270 disposed and suitably nested by conventional means in casing member 252, respectively, adjacent apertures 260, 262 and 264 and positioned to respectively receive male terminals 220, 222 and 224 of coffee maker 200. A flexible, insulated two-conductor power cord 272, which includes flexible conductors 280 and 282, is secured to and extends through a flexible rubber strain relief 274 into the interior of casing member 252. The strain relief 274 and the power cord 272 are received in a suitable open-ended U-shaped slot 278 provided in casing member 254.

Thermostat 300 is mounted entirely within probe housing or section 256 in electrically insulated and thermally conductive relation therewith. The mounting of thermostat 300 within probe housing 256 may be substantially identical to either of species of mountings of thermostat 100 in probe section 31 described above and illustrated in FIGS. 3 and 3a.

Casing member 252 with its integrally formed or molded probe section 256 provides substantially all of the beneficial advantages and results inherent in and described above with respect to casing members 33, 32 and probe section 31 of detachable control plug 30.

Figure 18:
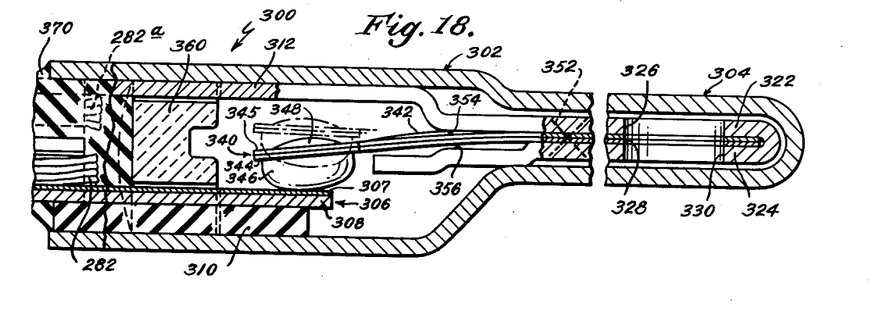
FIG. 18 is a sectional view similar to FIG. 7 of a snap-acting type thermostatic control assembly.
Figure 19:
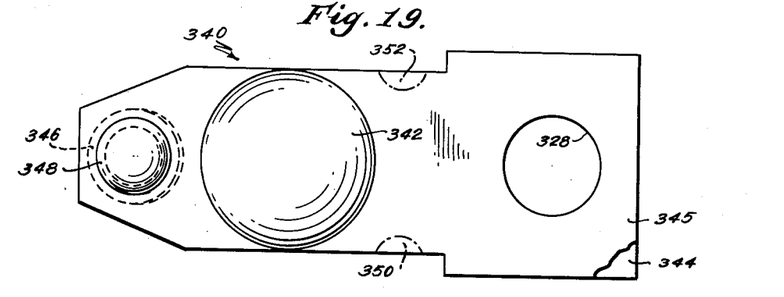
FIG. 19 is a top plan view of the snap-acting type heat and current responsive control member shown in FIG. 18.

FIGS. 18 and 19 illustrate, by way of example, and not limitation, one specific type of heat and current sensitive thermostat which might be employed with the detachable control plug 250 described above. The heat and current sensitive thermostat 300 illustrated in FIGS. 18 and 19 has been found to be especially suited and particularly well adapted for the detachable control plug 250 described above. It is to be understood, however, that there may be other heat and current sensitive thermostats which could also be employed within the integrally formed or molded probe section 256 of the casing member 252 in the practice of the instant invention. The exemplary heat and current sensitive thermostat illustrated in FIGS. 18 and 19 also forms the subject matter of the copending application mentioned earlier to which reference may be had for specific details of construction.

The heat and current sensitive thermostat 300 is generally similar in construction to the exemplary thermostat 100 described above and differs mainly in that the thermal element of the thermostat 300 is of a snap-acting type whereas the thermal element 140 of thermostat 100 is a creep-acting type.

As shown in FIGS. 18 and 19, open-ended metallic electrically conducting housing or can 302, stationary or fixed contact-carrying lower terminal 306, insulator 310, electrically conducting upper terminal 312, which includes closely spaced and substantially parallel portions 322 and 324, which sandwich and mount therebetween in cantilever fashion and in electrical conducting relationship one end of snap-acting thermal element 340, and ceramic header spacer means 360 of thermostat 300 are or may be substantially identical, respectively, to can 102, stationary contact-carrying terminal 106, insulator 110, upper terminal 112 and ceramic header 160 of thermostat 100 described above. Snap-acting thermostatic element 340 is sandwiched and mounted between portions 322 and 324 of upper terminal 312 in substantially the same manner as in the mounting of creep-type thermal element 140. However, snap-acting thermostat element 340 is also welded as at 350 and 353 to portions 322 and 324 of upper terminal 312.

Thermal element 340 is a snap-acting element and comprises an elongated strip of thermostat metal, which may be in the form of conventional bimetal, having a dimpled or dished area 342 provided therein as shown. Such an element is shown and described in the John A. Spencer United States Patent No. 1,448,240 of March 13, 1923. As illustrated in FIG. 18, the high-expansion metal is on the bottom as at 344, that is, it is on the concave side of dished area 342. The low-expansion metal layer 345 is on the upper or convex side. Thermostatic snap-acting element 340 basically is one of the well-known so-called inherent differential type of snap-acting thermostats in which the portion 342 comprises a non-developable surface.

Snap-acting element 340 is provided with a contact 346 which is secured to the free end of snap-acting thermal element 340 by rivet 348. As more fully described in the above-mentioned copending application, surface portion 354 of portion 322 of upper terminal 312 is closely spaced to and is engageable with the convex portion of dished portion 342 when the snap-acting element is in the contacts-closed position as shown in full lines in FIG. 18 to prevent the snap-acting element 340 from "creeping" to a contacts-open position. Surface portion 356 of lower portion 324 of upper terminal 312 engages the convex bottom side of dished portion 342 when thermal element 340 has snapped to a contacts-open position to prevent the snap-acting thermal element 340 from creeping to a contacts-closed position. In order to assure that the large percolating heater will not be re-energized once the percolation cycle has been completed and the percolation heater has been de-energized, it is necessary that a sufficiently large differential be provided for the snap-acting thermal element. The temperature at which snap-acting element 340, after cooling, will snap back to its original contacts-closed position illustrated in full lines in FIG. 18, should be considerably below the temperature maintained by the "keep-hot" heater 208. This requirement of a large differential for snap-acting thermostat advantageously permits provision of a low-cost snap-acting device. Ordinarily a snap-acting device such as that described above which is required to have a relatively small temperature differential (i.e. the difference in the temperature at which the snap-acting device snaps from a contacts-closed to a contacts-open position and the temperature at which it snaps, after cooling from a contacts-open to a contacts-closed position) requires much more intricate manufacturing tolerances and is considerably more expensive to produce than a snap-acting device with a large temperature differential. The remainder of thermostat 300 may be substantially identical to that of thermostat 100. After the entire thermostat assembly has been inserted into can 302, an electrically insulating epoxy sealing compound 370, similar to that described above for thermostat 100, is applied about the open end 305 of housing or can 302 to seal the assembly in can 302 in final assembled position. Snap-acting thermal element 340, as thermal element 140 of thermostat 100, can be calibrated by deforming the reduced portion 304 of can 302 as described above with regard to thermostat 100 and as more fully described in the above-referred to copending application.

Figure 20:
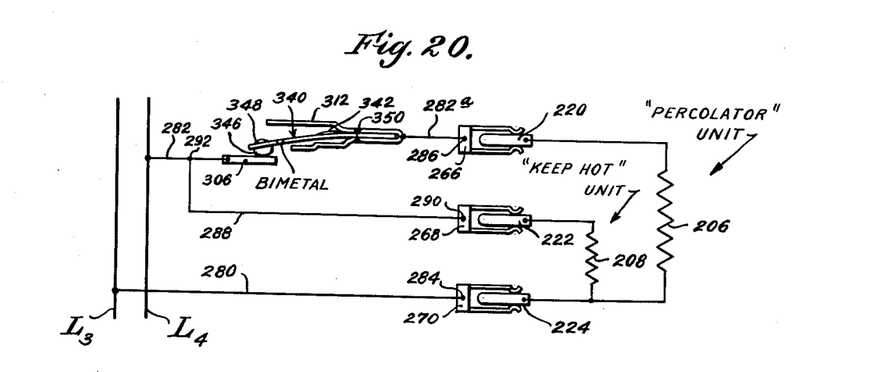
FIG. 20 is a schematic diagram of a circuit in which the snap-acting probe type thermostat may be employed with a two-heater type electric cooking device.

FIG. 20 illustrates a schematic circuit diagram in which the snap-acting element 340 is mounted in upper terminal 312, which is electrically connected by conductor 282a to spring clip terminal 266, as at 286. Contact 346 is shown in electrical engagement with contact-carrying terminal 306, the latter of which is electrically connected to conductor 282 which is adapted for connection to L$_4$, one side of a power source. Conductor 280 is electrically connected to spring clip terminal 270 as at 284 and is adapted for connection to L$_3$, another side of a power source. Conductor 288 electrically connects conductor 282 as at 292 to spring clip terminal 268 as at 290. Spring clip terminals 266, 268 and 270 are illustrated in FIG. 20 as being releasably electrically connected respectively with male terminals 220, 222 and 224 of coffee maker 200. Male terminals 222 and 224 are respectively connected to opposite sides of "keep-hot" heater 208 of coffee maker 200. Larger percolator heater 206 is connected in parallel electrical circuit relationship with "keep-hot" heater 208 and is respectively electrically connected at opposite sides to bayonet terminals 220 and 224. When percolation has been completed, the snap-acting device 340 will snap from a contacts-closed to a contacts-open position, thereby de-energizing percolator heater 206, leaving "keep-hot" heater 208 energized to maintain the coffee at a keep-hot drinking temperature.

Conductors 282a, 46a, 282 and 46 are shown in FIGS. 18 and 7, respectively, electrically connected to upper terminals 312 and 112 and lower terminals 306 and 106 as by crimping. It should be understood, however, that any other suitable method of electrically connecting the conductors to the terminals could be employed such as, for example, soldering, welding, or the like. The above also applies to the electrical connections to spring clip terminals 39 and 40 and 266, 268 and 270, respectively, of thermostats 100 and 300. Detachable control plug 250 can also be provided with an indicating lamp (not shown) similar to lamp 49 of detachable control plug 30, which would be visible through window or aperture 258.

As explained above, since the temperature at which the snap-acting element 340 will snap from a contacts-open to a contacts-closed position is considerably lower than the temperature maintained by the "keep-hot" heater, the danger of re-energizing the percolator heater 206 and causing re-percolation is thereby obviated. Detachable control plug 250, as detachable control plug 30, additionally provides current overload protection which is particularly desirable on an immersible appliance where the presence of moisture might cause temporary short circuiting. Thus it is also seen that each of coffee makers 10 and 200 can be constructed so as to be completely immersible in water or other suitable cleaning fluid since the detachable control plugs 30 and 250 incorporate therein all of the necessary control features for controlling the coffee maker as described above.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:
1. A condition-responsive control device for an electrical appliance such as a coffee maker or the like; said device comprising a housing; electrical current conducting circuit means disposed in said housing in electrically insulated relation therewith, and adapted for connection to a source of electrical power; said circuit means including terminal means adapted to be detachably electrically connected to current-conducting means on said electrical appliance; said housing including thermally conductive housing means adapted to be located in thermally conductive juxtaposition within a heat-conducting well in said electrical appliance; said circuit means including heat and current responsive switch means disposed in thermally conductive proximity with and substantially entirely within said thermally conductive housing means; said switch means comprising a heat-conductive casing; a thermally responsive current-conducting element disposed within said casing and in heat-transfer relation thereto; said element being operative to make and break said circuit means at predetermined temperature conditions; and heat produced by current traversing said element being responsible for at least a part of said predetermined temperature conditions.

2. The device as set forth in claim 1 and wherein at least a portion of said housing is formed integrally with said thermally conductive housing means as a one-piece construction; said portion of said housing and said housing means being formed of a material which is both electrically insulating and heat conducting.

3. A condition-responsive control device for an electric coffee maker having a single electrical heating element; said device comprising a housing; at least a portion of said housing being formed of electrically insulating material; current-conducting circuit means disposed in said housing in electrically insulated relation therewith and adapted for connection to a source of electrical power; said circuit means including terminal means for detachably electrically connecting said device with said electrical heating element of said electric coffee maker; said portion of said housing including a projecting tubular housing member former integrally therewith as a one-piece construction; said projecting member being adapted to be located in thermally conductive juxtaposition within a heat-conducting well in said coffee maker; said circuit means including heat and current responsive switch means disposed in thermally conductive proximity with and substantially entirely within said projecting housing member; said switch means including a creep-acting type thermally responsive current-conducting element; said element being responsive to ambient heat and also to heat produced by current traversing said element and being operative to make and break said circuit means at predetermined temperature conditions to control said single heating element of said electric coffee maker so as to maintain the contents of said coffee maker at a "keep hot" temperature after percolation has occurred without permitting re-percolation.

4. In combination: an electric coffe maker having a high heat electrical heating element and a low heat electrical heating element; a control device for said coffee maker, said device comprising a housing; at least a portion of said housing being formed of electrically insulating material; current-conducting circuit means disposed in said housing in electrically insulated relation therewith and adapted for connection to a source of electrical power; said circuit means including terminal means for detachably electrically connecting said device with each of said high and low heat electrical heating elements; said portion of said housing including a projecting tubular housing member formed integrally therewith; said projecting housing member and said portion of said housing comprising a one-piece construction; said projecting housing member being adapted to be located in thermally conductive juxtaposition within a heat-conducting well in said coffe maker; said circuit means including heat and current responsive switch means disposed in thermally conductive proximity with and entirely within said projecting housing member; said switch means including a snap-acting type thermally responsive current conducting element; said element being electrically connected in series with said high heat electrical heating element when said device is detachably electrically connected to said high and low heat heating element; said snap-acting element being responsive to ambient heat and also to heat produced by current traversing said snap-acting element and being operative to make and break the circuit for said high heat electrical heating element to interrupt the flow of current thereto at predetermined temperature and current conditions.

5. An electrical cooking device comprising a heating vessel; electrical heating means associated with said vessel for heating said vessel during a cooking operation; a first electrical circuit means associated with said heating means; said cooking device further including a heat conducting well in thermally conductive juxtaposition to said heating means and said heating vessel; a condition-responsive control device detachably secured to said cooking device, said control device comprising a housing; a second electrical circuit means disposed in electrically insulated relation within said housing and adapted for connection to an electric power source, said second electrical conducting circuit means including terminal means detachably connected in electrically conductive relationship with said first electrical circuit means, said housing having formed integrally therewith projecting thermally conductive housing means disposed in thermally conductive juxtaposition within said heat conducting well in said cooking device; at least a portion of said housing forming a one-piece construction with said housing means; said second electrical conducting circuit means including heat and current sensitive switch means disposed in thermally conductive juxtaposition to the confining walls of and disposed entirely within said thermally conductive housing means and operative to automatically make and break one of said circuit means at predetermined temperature and electrical current conditions.

6. An electrical cooking device comprising a heating vessel; electrical heating means associated with said vessel for heating said vessel during a cooking operation; a first electrical circuit means associated with said heating means; said cooking device further including a heat-conducting well in thermally conductive juxtaposition to said heating means and said heating vessel; a condition-responsive control device detachably secured to said cooking device, said control device comprising a housing; a second electrical circuit means disposed in electrically insulating relation within said housing and adapted for connection to an electric power source, said second electrical conducting circuit means including terminal means detachably connected in electrically conductive relationship with said first electrical circuit means, said housing having formed integrally therewith projecting thermally conductive housing means disposed in thermally conductive juxtaposition within said heat-conducting well in said cooking device; at least a portion of said housing forming a one-piece construction with said projecting housing means; said second electrical conducting circuit means including heat and current sensitive switch means disposed in thermally conductive juxtaposition to the confining walls of and disposed substantially entirely within said projecting thermally conductive housing means and operative to automatically make and break one of said circuit means at predetermined temperature and electrical current conditions; said heat and current sensitive switch means comprising a pair of electrical contacts, at least one of which is movable, each electrically connected to said second electrical circuit means; a thermally responsive composite electrically conductive element operatively connected with said one movable contact for movement thereof into and out of engagement with the other of said contacts; said thermally responsive element being responsive to ambient temperature changes as well as to heat generated by current traversing said element and being operative to open and close said contacts and thereby automatically make and break the circuit associated with said heating means at predetermined temperature and current conditions.

7. The cooking device as recited in claim 5 and wherein said cooking device is an electric coffee maker and said heating means comprises a single electrical heating element and said heat and current sensitive switch means comprising a bimetallic creep-acting type which is responsive to both heat and electrical current to automatically regulate said single heater of said automatic coffee maker to maintain the contents of said coffee maker at a second "keep-hot" temperature after percolation at a higher first temperature has occurred, without permitting re-percolation.

8. The cooking device as recited in claim 5 and wherein said cooking device is an electric coffee maker and said heating means comprises a high heat and a low heat electrical heating element, said heat and current sensitive switch means comprising a bimetallic snap-acting disc-type element and operative at predetermined temperature and electric current conditions to automatically open said contacts to de-energize said high heat electrical heating element.

9. In an electric coffee maker including a vessel; an electrical heating means therefor; a condition responsive control device detachably secured to said electric coffee maker for controlling said heating means, said device including temperature and current responsive switch means for controlling the flow of current to said heating means so as to maintain the contents of said vessel at a "keep-hot" temperature after percolation has occurred without permitting re-percolation, said device comprising a housing, at least a portion of which is formed of electrically insulating material; circuit means associated with said switch means and adapted for connection to an electrical power source, circuit means for heating said heating means; said first-named circuit means being detachably associated with said circuit means for heating said heating means; said housing portion further including heat conducting enclosure means formed integrally therewith; means forming a heat conducting path between said heat conducting enclosure means and said electric coffee maker; said temperature and current responsive switch means being disposed entirely within said heat conducting enclosure means, said temperature and current responsive switch means including a thermally responsive current-conductive element being responsive to ambient temperature changes, as well as to heat produced by current traversing said element, and operative to open and close said circuit means for heating said heating means at predetermined temperature and current conditions.

10. The structure defined in claim 9 and wherein said heat conductive enclosure means is formed of material which is electrically insulating and heat conducting.

11. The structure as defined in claim 9 and wherein said heat conducting enclosure means comprises an enclosed probe-type housing projecting integrally from said housing portion forming a one-piece construction therewith, and said means forming a heat conducting path comprises a heat conducting well in said electrical coffee maker disposed in thermally conductive juxtaposition to said heating means and to the interior of said vessel, said heat conducting probe-type housing being disposed in detachable thermally conductive juxtaposition within said heat conducting well.

12. The structure as defined in claim 9 and wherein said temperature and electrical current responsive switch means comprises at least a pair of electrical contacts; said thermally responsive current-conducting element comprising a bimetal element operatively connected to one of said contacts for movement of the latter into and out of engagement with the other of said contacts at predetermined temperature and current conditions.

13. The structure as defined in claim 12 and wherein said bimetal heat sensitive element comprises a snap-acting element.

14. The structure as defined in claim 12 and wherein said bimetal heat and current sensitive element comprises a creep-acting element.

15. A condition-responsive control device for an electrical appliance such as a coffee maker or the like; said device comprising a housing; electrical current conducting circuit means disposed in said housing in electrically insulated relation therewith, and adapted for connection to a source of electrical power; said circuit means including terminal means adapted to be detachably electrically connected to current-conducting means on said electrical appliance; a projecting probe-type housing member formed integrally with a portion of said housing as a one-piece construction; said projecting housing being formed of thermally conductive electrically insulating material and adapted to be located in thermally conductive juxtaposition within a heat-conductive well in said electrical appliance; said circuit means including heat and current responsive switch means disposed in thermally conductive proximity with and substantially entirely within said projecting housing; said switch means including a thermally responsive current-conducting element; said element being responsive to heat produced by current traversing said element and to ambient heat and operative to make and break said circuit means at predetermined temperature and current conditions.

References Cited in the file of this patent

UNITED STATES PATENTS

| 2,573,483 | Peters | Oct. 30, 1951 |
| 2,666,115 | Day | Jan. 12, 1954 |
| 2,692,937 | Clark | Oct. 26, 1954 |
| 2,773,959 | Moyer | Dec. 11, 1956 |
| 2,847,553 | Smith | Aug. 12, 1958 |
| 2,854,548 | Cassidy | Sept. 30, 1958 |
| 2,903,552 | Jepson et al. | Sept. 8, 1959 |
| 2,956,136 | Schwaneke | Oct. 11, 1960 |

FOREIGN PATENTS

| 204,091 | Australia | Sept. 20, 1956 |
| 219,888 | Australia | Jan. 19, 1959 |

UNITED STATES PATENT OFFICE
CERTIFICATE OF CORRECTION

Patent No. 3,031,565            April 24, 1962

David B. Appleton et al.

It is hereby certified that error appears in the above numbered patent requiring correction and that the said Letters Patent should read as corrected below.

Column 5, line 59, strike out "in"; column 6, line 50, for "oppoiste" read -- opposite --; column 8, line 70, for "353" read -- 352 --; column 9, line 49, for "insered" read -- inserted --; column 11, line 16, for "former" read -- formed --; line 50, for "coffe" read -- coffee --.

Signed and sealed this 4th day of September 1962.

(SEAL)
Attest:

ERNEST W. SWIDER
Attesting Officer

DAVID L. LADD
Commissioner of Patents